(12) United States Patent
Muschelknautz et al.

(10) Patent No.: US 7,815,875 B2
(45) Date of Patent: Oct. 19, 2010

(54) DEVICE FOR CONVERTING GASEOUS STREAMS

(75) Inventors: Sebastian Muschelknautz, München (DE); Harald Ranke, Pöcking (DE); Hanno Tautz, München (DE)

(73) Assignee: Linde Aktiengesellschaft, Munich (DE)

( * ) Notice: Subject to any disclaimer, the term of this patent is extended or adjusted under 35 U.S.C. 154(b) by 485 days.

(21) Appl. No.: 10/556,164

(22) PCT Filed: Apr. 22, 2004

(86) PCT No.: PCT/EP2004/004283

§ 371 (c)(1), (2), (4) Date: Nov. 6, 2006

(87) PCT Pub. No.: WO2004/098766

PCT Pub. Date: Nov. 18, 2004

(65) Prior Publication Data

US 2007/0166211 A1    Jul. 19, 2007

(30) Foreign Application Priority Data

May 9, 2003    (DE) ................ 103 20 965

(51) Int. Cl.
*B01J 8/02* (2006.01)
*F23C 5/00* (2006.01)
*F23D 11/00* (2006.01)
(52) U.S. Cl. .............. 422/211; 422/222; 422/224; 48/127.9; 431/8; 431/159; 431/177; 431/185
(58) Field of Classification Search ............... 422/211, 422/222, 224; 48/127.9; 431/8, 159, 177, 431/181, 182, 185
See application file for complete search history.

(56) References Cited

U.S. PATENT DOCUMENTS

| 2,838,105 | A | * | 6/1958 | Eastman et al. | .......... 239/132.3 |
| 3,532,462 | A | | 10/1970 | Zirngibl et al. | |
| 4,770,930 | A | * | 9/1988 | Wrenn et al. | ............ 428/293.4 |
| 6,123,542 | A | * | 9/2000 | Joshi et al. | .................. 431/183 |
| 6,312,651 | B1 | * | 11/2001 | Watson et al. | ............... 422/182 |
| 2002/0110711 | A1 | | 8/2002 | Boneberg et al. | |
| 2003/0066239 | A1 | | 4/2003 | Parchamazad | |
| 2004/0042952 | A1 | | 3/2004 | Bergeron et al. | |

FOREIGN PATENT DOCUMENTS

| EP | 1 160 009 A | 12/2001 |
| EP | 1 203 750 A | 5/2002 |
| WO | WO 03/031049 A | 4/2003 |

* cited by examiner

*Primary Examiner*—Walter D Griffin
*Assistant Examiner*—Lessanework Seifu
(74) *Attorney, Agent, or Firm*—Millen, White, Zelano & Branigan, P.C.

(57) ABSTRACT

The invention relates to a device for the reactive conversion of gaseous streams at high temperatures in excess of 1000° C. Said device comprises a reaction chamber (8) with an inlet opening for the gaseous streams to be converted, in particular a burner head (2) and an outlet opening for the converted gaseous streams. In order to guarantee the highest possible conversion performance, the reaction chamber (8) has a narrow construction, extending longitudinally from the inlet opening to the outlet opening to form a controlled gaseous flow, thus preventing a circulatory flow in the reaction chamber (8). To achieve reaction conditions that are as adiabatic as possible, the reaction chamber (8) is thermally insulated with a layer (7) that has a porous foam and/or fiber structure. In the simplest embodiment, the reaction chamber (8) is cylindrical, thus achieving a tubular flow reactor construction for the entire device.

23 Claims, 2 Drawing Sheets

DEVICE FOR CONVERTING GASEOUS STREAMS

Figure 1:
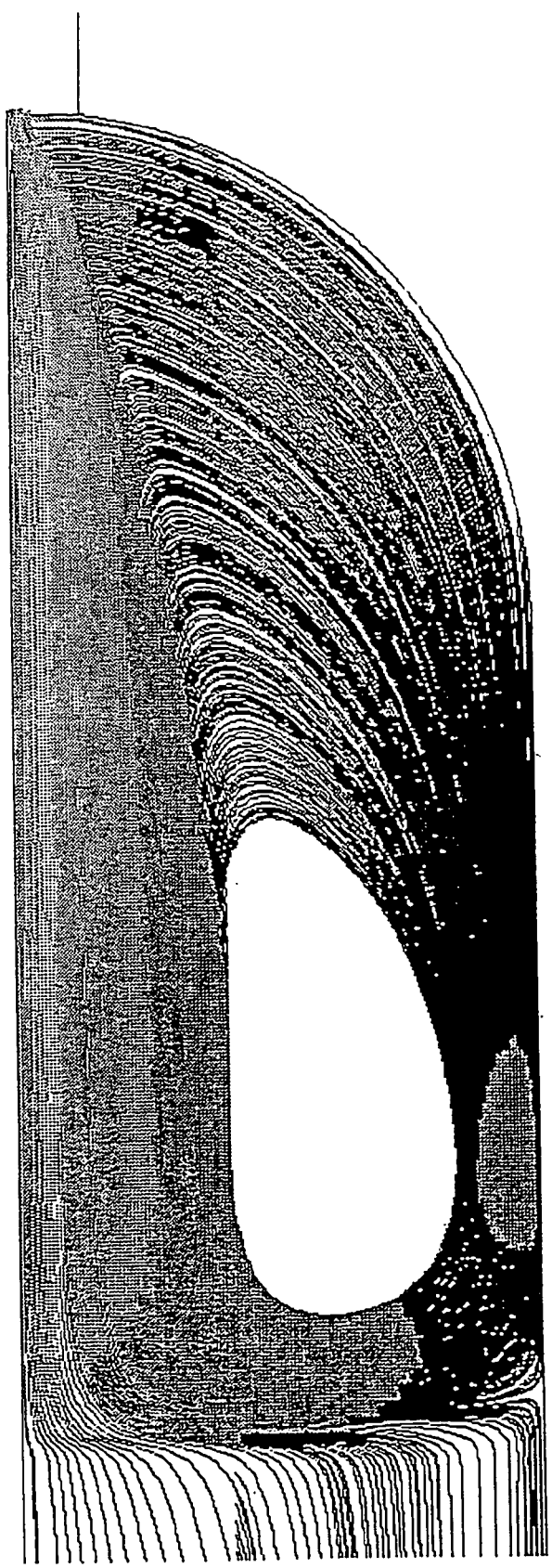

The invention relates to a device for reacting streams of gas at high temperatures exceeding 1000° C. in a reaction space surrounded by a wall with an inflow opening for the gas streams that are to be reacted and an outflow opening for reacted gas streams.

Such devices are used, e.g., as reactors in the chemical or petrochemical industry to carry out reactions between different flows of material for producing a product or intermediate product from raw materials. Often such reactors are intended for oxidation of hydrocarbons, a hydrocarbon-containing fuel, e.g., natural gas, being reacted with an oxygen-containing gas at high temperatures of, e.g., 1000-1600° C. For example, to produce synthesis gas, cylindrical reactors provided with a steel jacket are used, with cylinders closed with torospherical heads or basket arch bottoms. To protect the steel jacket against heat, a heat-insulating lining of refractory brick and refractory concrete is installed within the reactor. Within the reactor, partial oxidation of gaseous or liquid and solid fuels proceeds at temperatures of, e.g., 1200-1500° C. The fuels are supplied to the reactor through a burner nozzle. The inflowing media produce a pulsed stream in the reactor that excites a circulation flow in the reactor. This circulation flow causes rapid heat-up of the gases to the ignition temperature so that a flame forms downstream from the burner. Relative to the flame temperature, however, the temperature of the circulation flow is distinctly lower so that the flame is cooled by the added circulation gas. Such reactors are described in, e.g., "Hydrocarbon Technology International 1994, pp. 125 ff."

The object of this invention is to configure a device of the initially mentioned type such that the reaction performance level of the device is economically increased.

This object is achieved according to the invention in that the reaction space has a geometrical shape that prevents large-area circulation flows and that promotes a directed gas flow in the reaction space, with a lengthwise extension from the inflow opening to the outflow opening.

In this case, the wall should have heat conduction that is as low as possible in order to reduce heat losses, and it should withstand extremely high temperatures between, e.g., 1500 and 2000° C. Materials with a porous foam and/or fiber structure have been found to be especially advantageous.

The invention is based on the finding that the oxygen consumption and reaction performance of reactors depend largely on the reactor temperature, the flame temperature and the heat losses of the reactor. By using high temperature-resistant materials for heat insulation that at the same time have improved insulation action compared to previous materials, the heat losses of the reactor to the outside and in the combustion flame can be significantly reduced. Mechanisms for reaction acceleration can be used by adiabatic reaction control and a forced directed gas flow in the reaction space while avoiding a circulation flow. In particular, the reaction space is made such that a pipe flow is forced on the gas within the reaction space, in which no back-mixing at all takes place.

Based on the following relationships, a distinct increase of the reaction performance level of the reactors can be achieved with the invention.

1. The reaction performance level can be increased by computer by roughly 50% by adiabatically increasing the temperature radically by 150-200° C. in the oxidation phase.

2. In conventional reactors, relatively cold product gas is mixed into the flame by the heat loss of the reactor via the reactor wall and the circulation flow. In contrast to this, with the invention the mixing with cold product gas and cooling of the flame are avoided, increasing the reaction performance level.

3. The reaction velocity is dependent on the concentration of the reacting components. If as a result of the directed gas flow in the reaction space no product gas is mixed laterally into the flame, the average concentration is higher and thus the reaction is faster.

To form a directed gas flow while avoiding a circulation flow in the reaction space, especially a pipe flow, the device is preferably designed such that the wall in the inlet area of the reaction space widens uniformly from the diameter of the inflow opening to the largest diameter of the reaction space. Here, the widening of the wall advantageously comprises an angle of incline of the wall surface to the flow direction of the gas streams in the reaction space of less than 90°, preferably between 0 and 45°, and especially preferably between 30 and 45°. The inlet area, however, can also proceed directly with a sudden widening to a greater pipe diameter, only a small recirculation zone forming at the inlet. As before, large-area circulation is avoided. Furthermore, the flow can discharge directly at the same diameter as the burner into a reaction part. The inlet area is advantageously connected to a cylindrical area of the reaction space with a constant diameter. This cylindrical area is finally followed by an outlet area in which the diameter of the reaction space is preferably reduced in the flow direction.

According to one development of the inventive idea, the cylindrical area and/or the outlet area has a catalyst material. In this way, the reactions of the gas streams can be catalytically influenced in a deliberate manner. Moreover, this enables a further increase of the reaction performance level of the device.

One especially preferred embodiment of the invention is expressed in a deliberate choice of geometrical data of the device, with which the formation of a directed gas flow while avoiding a circulation flow in the reaction space is ensured. Thus, the ratio of the diameter to the length of the reaction space is between 2/3 and 1/30, preferably between 1/2 and 1/20 and especially preferably between 4/10 and 1/10. Moreover, the ratio of the area of the inflow opening cross section to the maximum reaction space cross section is advantageously between 1/2 and 1/20, preferably between 1/4 and 1/10.

In order to ensure especially effective heat insulation, the heat-insulating layer is preferably designed with a porous foam and/or fiber structure for low heat conduction from 0.14 to 0.5 W/mK at temperatures of up to 1600° C. The heat-insulating layer preferably has long-term resistance at temperatures exceeding 1600° C. The layer suitably consists of high-temperature-resistant materials, especially $Al_2O_3$ and/or $SiO_2$ and/or $ZrO_2$ and/or tungsten. Moreover, the foam and/or fiber structure is preferably soft and flexible, but has a stable shape and a low density of from 0.1 to 1 $kg/m^3$, preferably 0.15 to 0.7 $kg/m^3$, especially preferably 0.19 to 0.5 $kg/m^3$. Moreover, the surface of the heat-insulating layer has preferably been subjected to surface treatment.

According to another configuration of the invention, the heat-insulating layer consists of at least two components that are characterized by different density and/or hardness and/or expansion capacity and/or heat conductivity. The components are preferably coated over one another.

In order to achieve the desired increase in reaction performance level, the device is advantageously designed for certain operating conditions, as dictated by construction. Thus, the reaction space is advantageously designed for a pressure of from 1 to 100 bar, preferably 20 to 80 bar, especially preferably 25 to 60 bar. In addition, the inflow opening is advantageously made as a nozzle with an inner pipe and outer pipe that are arranged concentrically to one another for supply of the gas streams, the nozzle being designed for an exit speed of the gas streams of from 5 to 200 m/s, preferably 10 to 150 m/s and especially preferably 20 to 100 m/s. In this case, the nozzle can be made as a burner nozzle, the inner pipe being designed for supply of an oxygen-containing gas and the outer pipe being designed for supply of a fuel or vice versa. Furthermore, the burner nozzle is preferably made as a swirl-plate burner nozzle, a swirl being impressed on at least one of the gas streams. Another variant calls for the burner nozzle to be made as a jet burner nozzle without swirling of the gas stream. The reaction space is, moreover, advantageously designed for an effective gas flow velocity of from 1 to 100 m/s, preferably 5 to 80 m/s, especially preferably 10 to 50 m/s.

Adiabatic reaction control yields higher flame temperatures at the same oxygen consumption. Since the reaction velocity rises exponentially with temperature, the reaction space that is made for the combustion process as a combustion chamber can be made much smaller at higher temperatures. In already existing reactors, the desired adiabatic reaction effect can be achieved in that a heat-insulated pipe is inserted into the existing combustion space, the pipe directly adjoining the burner nozzle. In this case, the overall energy balance is preserved, the temperature in the pipe being increased locally and being decreased outside the pipe. In high-performance reactors for producing more than 1,000,000 Nm$^3$/h synthesis gas, the entire reactor can be designed as a pipe with a diffusor part that is connected to the burner nozzle. On the other hand, oxygen can be saved compared to a conventional reactor, with the reaction performance level remaining the same.

The pipe that has been inserted into the reaction space and that can also be called the burner pipe can be surrounded concentrically outside by a second pipe through which, for example, steam or a second gas mixture, for example from a primary reformer, flows and is mixed with the inner gas flow at the end of the pipe. In this way, the burner pipe is cooled on the outside and the high-temperature zone will be maintained.

The gas mixture can be ignited in various ways in the burner pipe. For example, ignition can take place by appropriately slow gas wall velocities in the burner pipe. In this case, the ignition temperature is reached by heat conduction from the outside from the preheated reactor. At higher gas velocities in the burner pipe, a high voltage spark source on the burner nozzle or in the vicinity of the burner nozzle can also initiate ignition.

The device according to the invention can be structurally designed for various applications:

One application is autothermal ethane cracking. Here, ethane is cracked into an ethylene-containing product gas as oxygen is supplied. To use the device according to the invention in autothermal ethane cracking, the device is designed for the corresponding operating conditions. In this connection, the reduction of heat losses that is achieved with the invention has a beneficial effect on the economic efficiency of autothermal ethane cracking.

Another possible application is partial oxidation of hydrocarbons into synthesis gas. With the device designed for the corresponding operating conditions, a significant increase of the reaction performance level can be achieved. Existing reactors for partial oxidation or autothermal reaction can be upgraded by installing a pipe following the burner nozzle in the reaction space. The hot phase of the reaction proceeds almost adiabatically in the pipe. The remaining residual volume of the reactor that has been retrofitted in this way can be used with catalyst material for residual reaction of methane.

One application of interest is also the use of the invention in conjunction with hydrogen technology for propelling motor vehicles. For example, in so-called automobile reformers in a motor vehicle, gasoline can be reformed into hydrogen. One disadvantage of conventional automobile reformers consists in that in the reforming of gasoline, large amounts of soot are formed. With the device according to the invention, a clear reduction of soot formation can be achieved. Moreover, the compact construction is well suited for automobile reformers with a small space requirement.

The invention can also be advantageously used in hydrogen filling stations. For this purpose, the device is structurally designed for the requirements of a hydrogen filling station for production of hydrogen in small reformers. The synthesis gas that is primarily produced can be shifted to a higher hydrogen content with the addition of steam. The remaining carbon monoxide can be reacted into hydrogen and carbon dioxide by a downstream shift reaction. Here, the minimized heat losses and the prompt starting readiness and compact construction of the system are also especially advantageous.

The device can also be designed for a reaction of $H_2S$ and $SO_2$ in Claus systems. The adiabatic effect also results in acceleration of the reaction velocity and thus improved reaction performance level here.

The invention will be explained in more detail below compared to the prior art using figures and tables:

FIG. 1 diagrammatically shows the behavior of streamlines of the gas flow in a conventional reactor. In the combustion chamber, a circulation flow forms that is cooled on the cold wall and that flows into the flame zone on the reactor head and cools it.

Figures 2, 3:
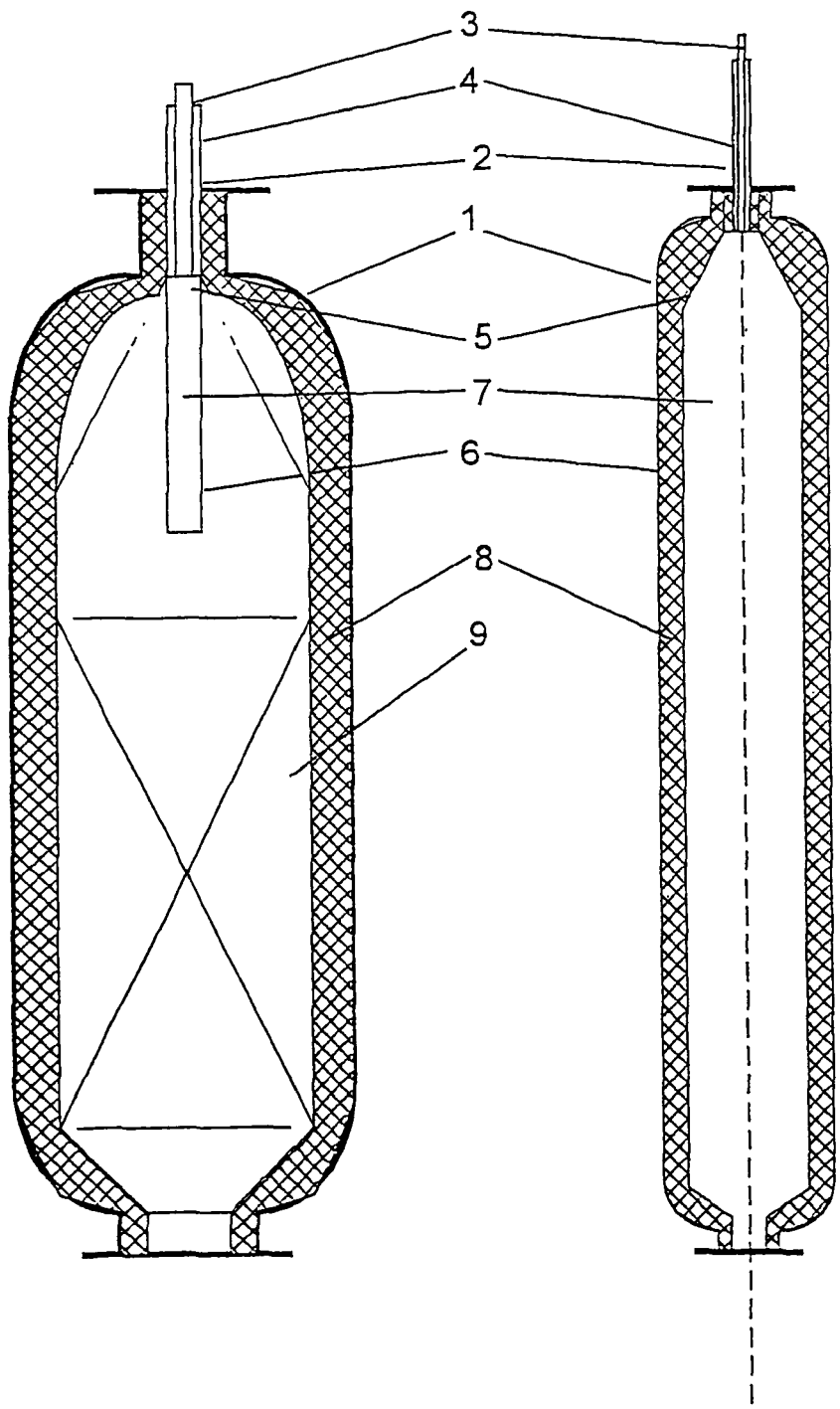

FIG. 2 diagrammatically shows a conventional reactor 1 with an inserted pipe burner 2. The oxidizer is preferably supplied via the inner pipe 3, and the fuel is preferably supplied via the concentric outer pipe 4. The burner is directly connected to a cylindrical pipe 6 as the combustion chamber 7 in which the hot oxidation phase proceeds. The combustion chamber is lined with a high-temperature-resistant heat insulation 8. Downstream from the pipe, the reacted gas flows into the outer reaction chamber and is uniformly distributed on the catalyst layer 9. Reforming of the remaining combustible gases takes place in the catalyst bed.

FIG. 3 diagrammatically shows one embodiment of an adiabatic pipe reactor according to the invention. Arranged on the head of the pipe reactor 1 is a burner nozzle 2 with an inner pipe 3 and an outer pipe 4. An oxygen-containing gas can be supplied via the inner pipe 3, and fuel, e.g., natural gas, can be supplied via the outer pipe 4. As an alternative, fuel can also be supplied via the inner pipe 3, and the oxygen-containing gas can be supplied via the outer pipe 4. A diffusor part 5 is connected to the burner nozzle 2 and a cylindrical section 6 is connected to the diffusor part. The cylindrical section 6 forms the actual reaction space, i.e., the combustion chamber 7, into which a directed pipe flow of the added gases or the product gases is formed. The combustion chamber 8 is heat-insulated by means of a heat-insulating layer 8 consisting of, e.g., porous or fibrous high-temperature-resistant material, such as, e.g., aluminum oxide foam. This arrangement provides that in the combustion chamber 7, a pipe flow is maintained while avoiding a circulation flow under adiabatic reaction conditions. In this way, a very high reaction performance level is ensured.

The invention claimed is:

1. A device for reacting streams of gas at temperatures exceeding 1000° C., comprising:

a reaction space surrounded by a wall with an inflow opening for introducing gas streams to be reacted, and an outflow opening for discharging reacted gas streams, said reaction space having a geometrical shape that prevents large-area circulation flows and that promotes a directed gas flow in the reaction space, with a lengthwise extension from the inflow opening to the outflow opening, and wherein the inner surface of said wall, facing the reaction space, is provided with a heat-insulating layer having a porous foam and/or fiber structure, said heat-insulating layer exhibiting a heat conduction of 0.14 to 0.5 W/mK at temperatures of up to 1600° C., the diameter of the inflow opening and the diameter of the outflow opening are both smaller than the largest diameter of the reaction space, the ratio of the area of the inflow opening cross section to the maximum reaction space cross section is between 1/2 and 1/20, and wherein the ratio of the diameter of the reaction space to the length of the reaction space is between 4/10 and 1/10.

2. A device according to claim 1, wherein said device further comprises an inlet area wherein the wall widens from the diameter of the inflow opening to the largest diameter of the reaction space at an angle of incline of the wall surface to the flow direction of the gas streams in the reaction space of less than 90°;

said device further comprising a cylindrical area of the reaction space, said cylindrical area having a constant diameter and being connected to said inlet area; and said device further comprising an outlet area, connected to said cylindrical area, in which the diameter of the reaction space is reduced in the flow direction, said outlet area being connected to said outflow opening.

3. A device according to claim 1, wherein said device further comprises an inlet area wherein said wall widens from the diameter of said inflow opening to the largest diameter of the reaction space.

4. A device according to claim 3, wherein the wall in said inlet area widens at an angle of incline of the wall surface to the flow direction of the gas streams in the reaction space of less than 90°.

5. A device according to claim 4, further comprising a cylindrical area of the reaction space having a constant diameter which is connected to said inlet area.

6. A device according to claim 5, further comprising an outlet area, in which the diameter of the reaction space is reduced in the flow direction, which is connected to said cylindrical area.

7. A device according to claim 6, wherein said cylindrical area and/or said outlet area contains a catalyst material.

8. A device according to claim 1, wherein said heat-insulating layer consists of high temperature-resistant materials.

9. A device according to claim 1, wherein said foam and/or fiber structure is soft and flexible, but has a stable shape.

10. A device according to claim 1, wherein the surface of the heat-insulating layer has been subjected to surface treatment.

11. A device according to claim 1, wherein the heat-insulating layer comprises at least two components.

12. A device according to claim 11, wherein said components are coated over one another.

13. A device according to claim 1, wherein the reaction space is designed for a pressure of from 1 to 100 bar.

14. A device according to claim 1, wherein said inflow opening is made as a nozzle comprising an inner pipe and outer pipe that are arranged concentrically to one another for supply of gas streams, said nozzle being designed to permit a gas flow exit speed of up to 200 m/s.

15. A device according to claim 14, wherein said nozzle is made as a burner nozzle, and said inner pipe and outer pipe are connected to a source of an oxygen-containing gas or a fuel.

16. A device according to claim 15, wherein the burner nozzle is made as a swirl-plate burner nozzle comprising means for imposing a swirl on a gas stream flowing through said inner pipe, a gas stream flowing through said outer pipe, or gas streams flowing through both said inner pipe and said outer pipe.

17. A device according to claim 15, wherein the burner nozzle is made as a jet burner nozzle without means for imposing a swirling of a gas stream.

18. A device according to claim 1, wherein the reaction space is designed for an effective gas flow velocity of from 1 to 100 m/s.

19. A device according to claim 2, wherein said angle of incline of the wall surface is between 0° and 40°.

20. A device according to claim 2, wherein said cylindrical area and/or said outlet area contains a catalyst material.

21. A device according to claim 2, wherein the ratio of the area of the inflow opening cross section to the maximum reaction space cross section is advantageously between 1/3 and 1/15, and said angle of incline of the wall surface is between 30° and 45°.

22. A device according to claim 2, wherein the ratio of the area of the inflow opening cross section to the maximum reaction space cross section is advantageously between 1/4 and 1/10, and said angle of incline of the wall surface is between 30° and 45°.

23. A device according to claim 1, wherein the heat-insulating layer is made from $Al_2O_3$, $SiO_2$, $ZrO_2$, and/or tungsten.

* * * * *